(12) United States Patent
Grimsland et al.

(10) Patent No.: US 6,174,228 B1
(45) Date of Patent: Jan. 16, 2001

(54) PROCEDURE AND EQUIPMENT FOR TREATING POULTRY BEFORE SLAUGHTER

(75) Inventors: Aage Grimsland, Larvik (NO); Bent Kloster Andreasen, Fredericia (DK)

(73) Assignee: Norsk Hydro ASA, Olso (NO)

( * ) Notice: Under 35 U.S.C. 154(b), the term of this patent shall be extended for 0 days.

(21) Appl. No.: 09/341,259

(22) PCT Filed: Dec. 10, 1997

(86) PCT No.: PCT/NO97/00331

§ 371 Date: Sep. 3, 1999

§ 102(e) Date: Sep. 3, 1999

(87) PCT Pub. No.: WO98/31231

PCT Pub. Date: Jul. 23, 1998

(30) Foreign Application Priority Data

Jan. 17, 1997 (NO) ..................................... 970229

(51) Int. Cl.⁷ ....................................................... A22B 3/00
(52) U.S. Cl. ................................................................. 452/66
(58) Field of Search .................................................. 452/66

(56) References Cited

U.S. PATENT DOCUMENTS 2,526,037 * 10/1950 Murphy .................................. 452/66
4,107,818   8/1978 Scott et al. .
5,152,714  10/1992 Audsley et al. .
5,435,776   7/1995 Owen et al. .
5,653,629   8/1997 Audsley et al. .

FOREIGN PATENT DOCUMENTS

94/15469   7/1994 (WO) .

* cited by examiner

Primary Examiner—Willis Little
(74) Attorney, Agent, or Firm—Wenderoth, Lind & Ponack, L.L.P.

(57) ABSTRACT

A method and apparatus for the treatment, such as anaesthetization or killing, of poultry by using gas. The gas comprises oxygen and carbon dioxide, among other components. During the treatment, the oxygen concentration is kept constant at a normal level (18–22 vol. %). This is important as it allows the poultry to breathe normally while the natural body functions can be maintained in their normal state until anaesthetization takes place. The concentration of carbon dioxide is increased either continuously or discontinuously. Accordingly, it is possible to anaesthetize poultry before slaughter in a way which produces low levels of stress and discomfort in the poultry while, at the same time, the quality of the meat is better than with the use of traditional methods. In the apparatus, the poultry are exposed to the gas in a chamber (1). The apparatus may include a belt conveyor (5) and can be separated into three treatment zones (2, 3 and 4).

18 Claims, 4 Drawing Sheets

PROCEDURE AND EQUIPMENT FOR TREATING POULTRY BEFORE SLAUGHTER

BACKGROUND OF THE INVENTION

1. Field of the Invention

The present invention relates to a method and apparatus for the treatment of poultry with gas before slaughter in order to anaesthetize or kill the poultry, in which gas containing oxygen and carbon dioxide is used.

2. Description of Related Art

The use of poultry meat is increasing continuously, and there is an increasing focus on the ethical aspects of such production. It is normal to anaesthetize the animals directly before slaughter for several reasons, but mainly in order that the animals shall behave calmly and do not feel pain or discomfort during the slaughter process. Today, anaesthetization is mainly carried out electrically, a method which has many problematic aspects. Increased focus on these aspects has led poultry producers to look for new, better alternatives for anaesthetization/slaughter.

Traditional anaesthetization is currently carried out by lifting the poultry out of a transport crate and suspending them individually in a shackle. Here they are suspended by the legs with the head down. This is in itself a major stress factor which causes the animals to become agitated. The animals remain suspended like this, often for several minutes, while they are conveyed to a plant for electrical anaesthetization. The anaesthetization itself takes place by each individual animal passing through a salt bath with an electrical charge. The head is lowered into the bath and the body serves as a living conductor between the current carrying salt bath and the shackle. This often leads to haemorrhaging in the thighs and breast muscles, broken legs on account of severe convulsions and consequently poor meat quality is obtained.

After the electrical anaesthetization, the animals are slaughtered individually by cutting their necks. This is also important in order to obtain immediate bleeding. The anaesthetization is important to ensure that the animals do not feel pain when their necks are cut. U.S. Pat. No. 4,107,818 discloses an apparatus for slaughtering small animals using carbon dioxide gas. The apparatus comprises two chambers, where the first chamber contains carbon dioxide gas which, together with oxygen, is intended to render a gentle anaesthetization of the animals. The concentration of carbon dioxide in the first chamber should be over 40%, while the concentration of oxygen should not be more than 50%. Such a large proportion of oxygen is desired to avoid stress and discomfort by the animals. At the same time, it is desirable to use a relatively high concentration of carbon dioxide in order to produce a rapid anaesthetic reaction by the animals, which may be adult cats. Mainly pure carbon dioxide gas is used in the second chamber, which causes the death of the animals when they are placed in this chamber.

WO 94/15469 discloses a method and apparatus for anaesthetizing poultry in which anaesthetic gas is used in two stages or chambers. A first stage comprises, as in the previous reference, an anaesthetic gas containing oxygen. The concentration of oxygen must be at least 15% and anaesthetic gases such as carbon dioxide, nitrous oxides, ether, etc. can be used. A preferred concentration of gas in this first stage is 60 vol. % carbon dioxide and 30 vol. % oxygen. As in the previous reference, the second stage must also comprise an anaesthetic gas. A mechanical conveyor system comprising shackles or cages can be used to convey the poultry through the chambers.

Other methods of anaesthetization include the use of gas with a low oxygen content (anoxic anaesthetization) in which the anaesthetic gas may also comprise a mixture of nitrogen or argon together with $CO_2$. An example of such a technique is disclosed in U.S. Pat. No. 5,152,714.

Commonly, the above mentioned methods all start the treatment directly at a high concentration of carbon dioxide, without paying much attention to the animals and how they react upon the treatment. According to the experience of the applicant, this may cause the following problems when treating poultry:

1. The poultry will feel pain in the mouth and throat region, because of the high concentration of carbon dioxide.
2. When treating for instance turkeys, the period needed to treat these animals may vary between each individual, because some of the turkeys may stop breathing in the actual atmosphere. Before breathing the stunning gas, some of them rather consume the oxygen contained in their internal air sacks.

SUMMARY OF THE INVENTION

The objective of the present invention is to treat the animals in a way which is more humane than previously known methods and which, at the same time, produces a better quality of slaughtered body. One objective of the present invention is to avoid stressing the animals as caused by suspension in shackles and to avoid the pain caused by the traditional method when the tips of the wings come into contact with the current carrying salt bath. Another objective is to reduce haemorrhaging and broken legs in the slaughtered body as a consequence of convulsions caused by electrical or anoxic methods of anaesthetization.

The present method differs considerably from other stunning methods which involve the use of gas in that carbon dioxide is the only active gas in the method. According to the present invention, the applicant has developed a method for the treatment of poultry before slaughter where the animals "believe" that they still breathe in a normal atmosphere, and thus they continue to breathe in a normal manner. This is achieved by the fixation of the oxygen concentration at about 20%. The anaesthesia according to the invention is thus achieved by a modification of the atmosphere or the air that surrounds the poultry. The concentration of carbon dioxide is increased gradually until a satisfying degree of anaesthesia is obtained. It is very important to start with a low value of carbon dioxide concentration in order to avoid the animals entering a state where they feel discomfort. Thus, the animals in a way "become used to" the anaesthetizing atmosphere. Furthermore, the animals are to be anaesthetized in a sitting/standing position so that natural body functions are maintained right up to the moment at which the anaesthesia takes effect.

BRIEF DESCRIPTION OF THE DRAWINGS

The present invention will be described in further detail in the following by way of examples and figures, where.

DETAILED DESCRIPTION OF THE INVENTION

Figure 1:
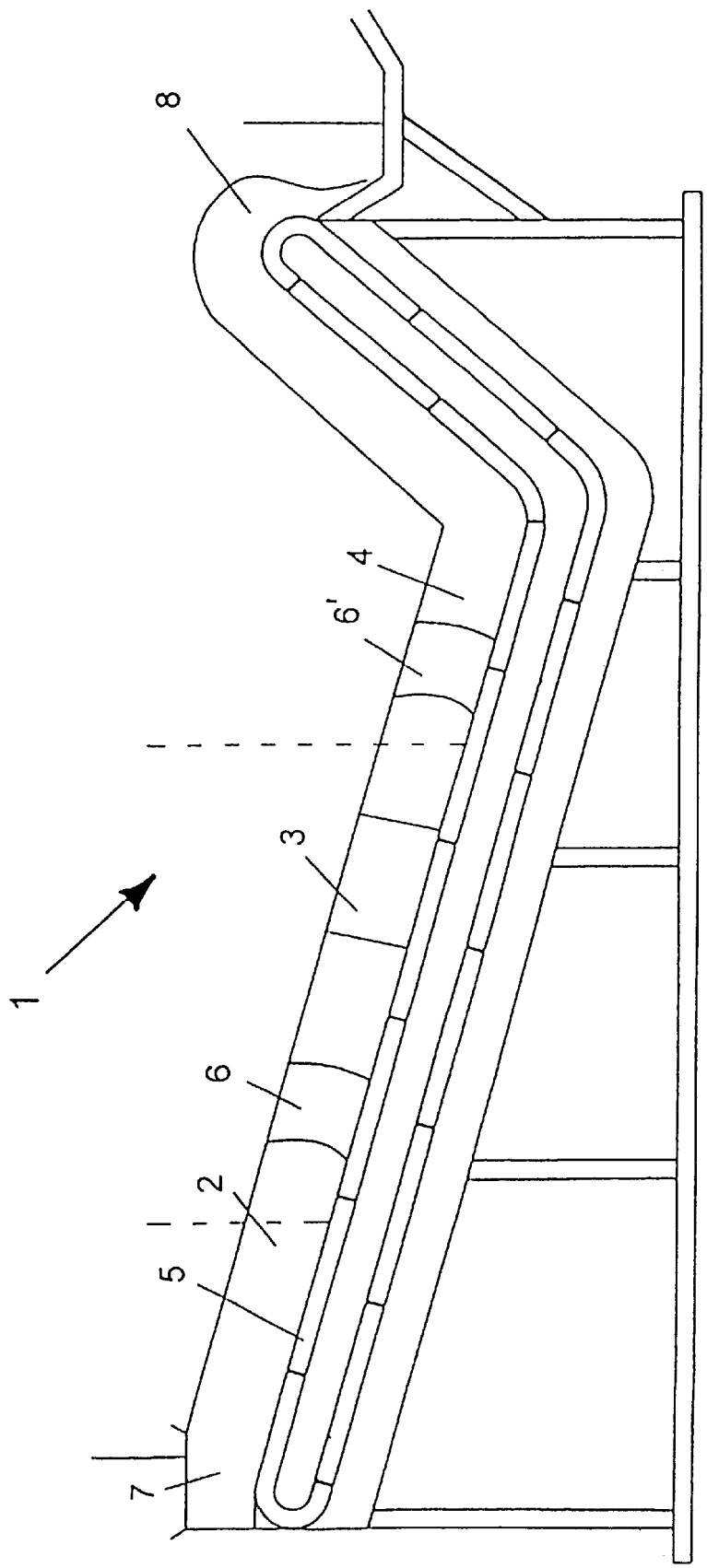
FIG. 1 shows a side view of apparatus for the anaesthetization of poultry in accordance with the present invention.

The present invention is based on the fact that animals, which are directly exposed to a high concentration of $CO_2$, feel pain in the mouth and throat region as a consequence of smarting pain caused by the formation of acid. For ethical reasons, it was a priority here to avoid these problems and it is therefore desirable to give the animals initial analgesic treatment. In accordance with the present invention, this is done by exposing the animals to a low $CO_2$ concentration while, at the same time, keeping the concentration of oxygen substantially constant, i.e. equivalent to the normal level in natural air. Treatment of the animals in this atmosphere causes a certain anaesthetization of the mouth and throat regions while, at the same time, giving them a certain tolerance of a $CO_2$ rich atmosphere.

The $CO_2$ concentration in this first phase may be 18 vol. % to 22 vol. % and the period of exposure may be approximately 30 seconds.

The objective of this phase is thus to give the animals a certain analgesic effect and tolerance of $CO_2$. This stage of treatment causes the animals to behave more calmly in the subsequent treatment.

After initial analgesic treatment, the animals are anaesthetized so that they become completely relaxed and fall into a light sleep. Experience and studies of literature suggest that this occurs by exposing the animals to a higher concentration of $CO_2$. At this point the present method differs from methods which use arioxic principles, as only $CO_2$ is used as the effective medium without removal or reduction of the content of oxygen. In order to maintain vital body functions and to stimulate that the animals do not reflexively stop breathing, oxygen is added in a manner that secures that its concentration is continuously kept at a normal level, i.e. between 18 and 22 vol. %. This results in the animals staying calm until they pass away.

The $CO_2$ concentration in this phase may be between 35 vol. % and 40 vol. % and the period of exposure at this concentration level may be approximately 50 seconds.

The objective of this second phase is thus to anaesthetize the animals slightly so that they do not become agitated during treatment.

The anaesthesia received by the animals in the second phase is not particularly deep and will not last for many seconds. In accordance with the present invention, a third phase is, therefore, used which produces deeper anaesthesia and will last for a sufficiently long period so that the animal is anaesthetized during slaughter, i.e. approximately one minute.

This can be achieved by exposing the animals to a $CO_2$, concentration of approximately 50 vol. % for a duration of approximately 30 seconds. On account of the desire to maintain the body functions as mentioned above, the concentration of oxygen must be kept at a normal level around 20 vol. %.

After this phase, the animals are conveyed out of the anaesthetization apparatus. Following this, the animals are suspended in shackles and are transported for slaughter by cutting their necks. The slaughtering procedure should take place as soon as possible after anaesthetization so that the animals do not wake up before their necks are cut. The anaesthesia should preferably last a little bit more than one minute.

Alternatively, the animals may be slaughtered in the third phase. This can be done by increasing the $CO_2$ concentration while, at the same time, possibly increasing the duration (exposure period) somewhat. The concentration of carbon dioxide in the initial stage should then be in the interval 0–25 vol. %, and within the interval 40–80 vol. % at the end of the treatment.

In the example described, the process of anaesthetization is divided into three phases. However, it should be made clear that this is only a practical adaptation of the principles of the present invention. Thus a gradual increase of the $CO_2$ concentration, either continuously or discontinuously by using several phases or stages while, at the same time, keeping the oxygen concentration substantially constant, will also lie within the framework of the present invention.

The method can be carried out with different types of equipment, that among other things will depend on whether the anaesthesia should be obtained by the use of different phases of carbon dioxide concentration, or by a continuous increase in the carbon dioxide concentration. This will be further described in the following examples and figures.

FIG. 1 shows an anaesthetization apparatus in accordance with the present invention. The apparatus includes means for carrying out the three phases of anaesthetization stated above. In particular, the apparatus comprises a chamber 1 or an anaesthetization tunnel with an inlet 7, three anaesthetization zones 2, 3 and 4 in which gas mixtures such as that stated above can be used, and an outlet 8. Each anaesthetization zone may have separate means for supplying carbon dioxide gas and oxygen gas respectively, and may, moreover, comprise the necessary equipment for continuously measuring the concentration of each gas component together with equipment for regulating the supply of each gas component. This type of equipment will be known to persons skilled in the art and is not, therefore, described in detail here.

The animals are conveyed in a sitting/standing position through the tunnel by means of a belt conveyor 5. The time spent (exposure period) in the tunnel can be varied by varying the speed of the belt. The time spent (exposure period) in each zone will, in addition to the speed of the belt, depend on the length of each zone. This length can be regulated by limiting the zones for example by means of louver curtains 6, 6' which are adapted to be moved along rails running lengthways in the tunnel. As can be seen in the figure, the base of the chamber 1 is arranged to be sloping downwards from the inlet 7 in the direction of the outlet 8 and is further arranged to be sloping upwards at the outlet 8. The objective of this is to use the difference in density between air and carbon dioxide to maintain a higher concentration of carbon dioxide in the end phase of the treatment. The features relating to the sloping of the tunnel together with the use of louver curtains make it possible to maintain the desired gas concentrations in each zone.

Possibly, a given amount of gas at a given concentration may be circulated between each zone and a mixing-/regulating chamber (not shown). The poultry may be transported through the tunnel in a transport crate or just simply by sitting on the belt.

Alternatively, the anaesthetization apparatus may comprise a continuous chamber equivalent to the anaesthetization tunnel described above but not divided into zones, i.e. the louver curtains are omitted (not shown). The chamber is equipped with means as stated above for the supply of $CO_2$ gas and oxygen gas and the oxygen concentration is kept at a constant level (approximately 20 vol. %) while the concentration of carbon dioxide gas is increased gradually over time. The supply of carbon dioxide here will be placed close to the outlet 8. As in the example given above, the animals, possibly several animals in small cages, may be conveyed on a belt conveyor through the chamber 1. The speed of the belt conveyor 5 is of significance for the treatment time in this embodiment as well.

Figure 2A:
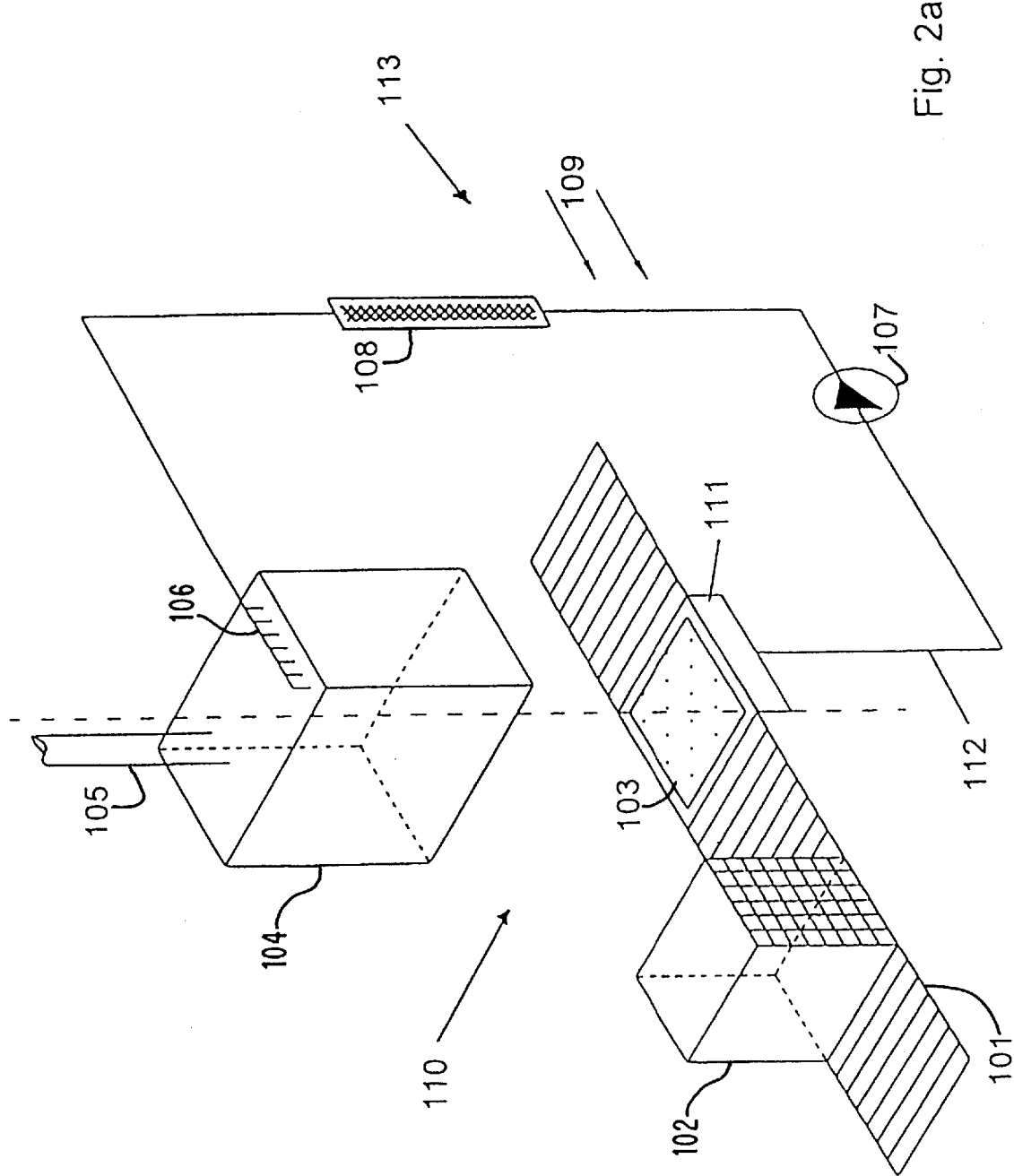
FIGS. 2a–2b show in perspective views an alternative apparatus, where the poultry is anaesthetized in transport crates that are enveloped by a bell-shaped chamber.

FIG. 2a shows an alternative apparatus in which the poultry is anaesthetized in transport crates 102, before entering the slaughtering process. In this preferred embodiment, the animals will not be moved while the anaesthetization takes place. The transport crates are moved to and from the anaesthetization station 110 by means of a belt conveyor 101. At the anaesthetization station 110 each crate 102 will rest immobile upon a perforated bottom or plate 103 while a suspended bell-shaped closure 104 is lowered down to envelope the crate 102. The closure may be suspended by means comprising a hoisting device (not shown). The gas concentration in the lowered closure is alternated in accordance with the above described method. The gas may be delivered to the closure in the following different ways:

1. Directly from gas containers or a gas mixer 113, as the concentration of carbon dioxide gradually is increased while the oxygen concentration is held at a constant level. A gas drain or outlet 105 at the upper region of the closure 104 will equalize the tendency of the pressure to increase inside the closure.

Gas or gas mixtures are entered into the closure at the upper region thereof at inlet nozzles 106, while it is evacuated through the perforated plate 103 by means of a pump 107. The perforated plate 103 is provided with a cover 111 that sealingly is affixed to the periphery of the perforated plate and that is further provided with an outlet line 112 connected with the pump. The gas leaves the pump and enters a mixing chamber 108 in the gas mixer 113 wherein the gas concentration is determined. When required, carbon dioxide or oxygen is added into the gas circulating circuit at a point 109 upstream of the mixing chamber 108. Exposing periods and gas concentrations are regulated by means of a programmable control unit (not shown). The anaesthetization technique described above is based upon a continuous increase in the carbon dioxide concentration.

Figure 2B:
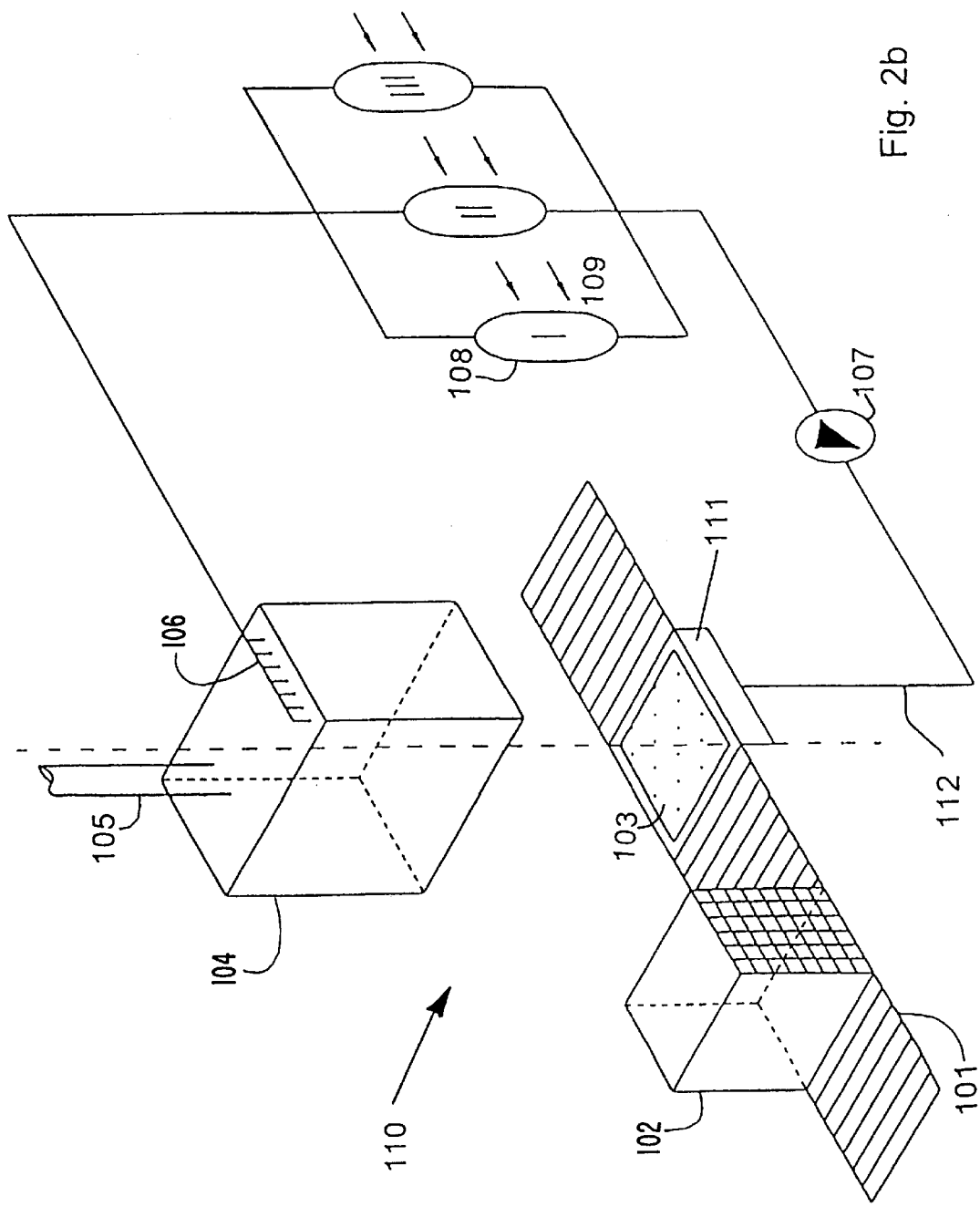

2. Alternatively, as shown in FIG. 2b, the gas may be circulated between the closure and three different mixing chambers (I, II, III), where the chambers comprise different gas concentrations in accordance with the described method. The equipment may be identical with that of the above described example, but the gas mixer has in this embodiment been replaced with three mixing chambers arranged in parallel with respect to the gas circulating circuit. In phase 1 gas is supplied from chamber I, in phase 2 gas is supplied from chamber II and in phase 3 gas is supplied from chamber III. All three chambers are provided with supply lines for carbon dioxide and oxygen, together with gas concentration detectors and a gas concentration control equipment (not shown). It shall be understood that the equipment may be further provided with means for the recovery of surplus gas (not shown), to reduce the amount of gas consumed.

Further, the supply means for gas may comprise means such as sensors for measuring the concentration of oxygen and carbon dioxide gas, which sensors are connected to a programmable control unit that regulates the oxygen supply in such a manner that the concentration is as constant as possible and further regulates the concentration of carbon dioxide gas in accordance with a predetermined time sequence. Furthermore, the equipment comprises supplies of carbon dioxide and oxygen gas connected to the chamber via valves controlled by the control unit.

In an alternative embodiment, several such closures can be applied simultaneously in the apparatus in order to increase the capacity so that the slaughter line at all times can be fed with a sufficient number of animals.

In the examples described here the gas is led into the upper region of the closure while gas is evacuated through the perforated bottom. Alternatively the gas may be led to the closure via the bottom or the sides, while gas may be evacuated by outlets arranged in the upper region or the sides thereof.

Figure 3:
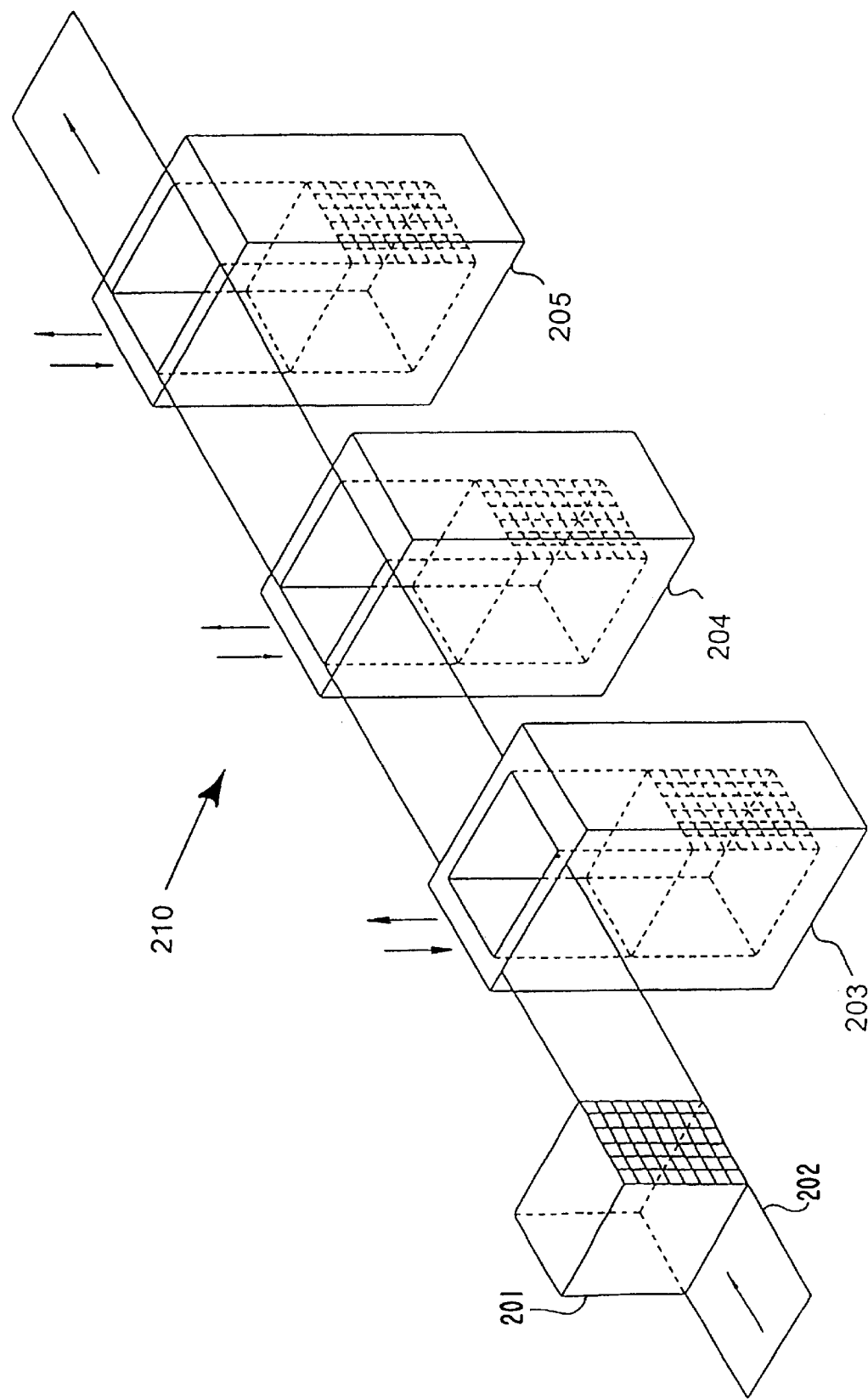
FIG. 3 shows a perspective view of an another apparatus, comprising transport crates and pits in which the crates are lowered, or alternatively the pits may be lifted up to envelope the crates.

FIG. 3 shows still an alternative apparatus that may be used in accordance with the described anaesthetization method. The crates 201 containing the poultry is transported by a belt conveyor 202 into an anaesthetization station 210 comprising pits or chambers 203, 204, 205 arranged at a level below a sectioned belt conveyor. The chambers comprise a bottom, side walls and an open top. When anaesthetizing the poultry with this equipment, the poultry contained in a first crate is lowered into chamber 203 where it is exposed to the first gas mixture in accordance with the present invention. After a given exposure period the crate is lifted out of the chamber and is thereafter lowered into a second chamber 204 that contains the second gas mixture. Simultaneously with the lowering of the crate into the second chamber, a following crate may be lowered into the first chamber 203. After a given exposure period, the first crate is taken out of the second chamber and is thereafter lowered into the last chamber 205 that contains the third gas mixture. Each chamber is provided with means for the supply of oxygen and carbon dioxide, and is further provided with means for measuring gas concentrations together with regulating/controlling means adapted thereto (not shown). The crates may be manipulated by a conveying system comprising leveling devices, such as hoists or the like to conduct the movements with respect to the chambers 203, 204, 205. Such devices are known to those skilled in the art and will not be further described here.

Alternatively, the crates may be moved at the same horizontal level throughout the apparatus while the chambers 203, 204, 205 may be lifted up to envelope the crates. The crates may then be positioned between the end of one belt conveyor section and the beginning of a succeeding belt conveyor section by a suspension device such as a lifting gear or the like, while the chambers are displaced vertically by a lifting device such as pneumatic actuators (not shown).

Using open topped chambers may be very valuable with respect to the consumption of gas for performing the method according to the invention. As the gas mixture will be heavier than the ambient air, there should be very little spillage of treatment gas to the surroundings, in particular when the chambers have a sufficient depth.

Tests

Test 1

Twenty-one turkeys were exposed to $CO_2$ concentrations from 20 vol. %. to 40 vol. % for 120 seconds. Only the highest $CO_2$ concentrations produced a slight anaesthetic effect but some indications of convulsions were observed in these animals. All the animals were treated in the sitting position.

Test 2

Thirteen turkeys were exposed to higher $CO_2$ concentrations, 40 vol. %–50 vol. % for up to 120 seconds.

There was a greater tendency towards anaesthetized animals in this test but two animals which were exposed to 50 vol. % $CO_2$ for more than one minute died. The animals were in the sitting position.

Test 3

Seven turkeys were exposed to $CO_2$ concentrations between 50 vol. % and 70 vol. % for a short period of time. This resulted in convulsions and death and is consequently unacceptable. The animals were in the sitting position.

Test 4

Eighteen turkeys were exposed to $CO_2$ concentrations between 55 vol. % and 70 vol. % for up to one minute. Here the oxygen concentration was kept to between 20 vol. % and 30 vol. %. Many more turkeys were anaesthetized in this test and the anaesthesia lasted longer than previously. It is clear that the turkeys tolerate higher $CO_2$ concentrations much better if the oxygen concentration is kept at a normal level. The combination of a high $CO_2$ % and long exposure, however, easily leads to convulsions and death. Animals in the sitting position were used in the test.

Test 5

Seventeen turkeys were exposed to $CO_2$ concentrations of between 30 vol. % and 60 vol. % for approximately one minute while the oxygen concentration was kept at approximately 25 vol. %. Many turkeys died at the highest $CO_2$ concentrations and the anaesthesia was unsatisfactory. The animals were in the sitting position.

Test 6

This test involved suspended animals. The $CO_2$ concentration was varied for each animal from approximately 20 vol. % with a gradual increase to 45 vol. %. Four turkeys were anaesthetized satisfactorily for approximately 1 minute while three died. Which turkeys survive and which die appears to be random. In this test, the turkeys flapped their wings a lot in the initial phase.

Test 7

Twenty-seven turkeys were exposed to treatment with an increasing $CO_2$ concentration which began at approximately 20 vol. % and increased gradually to 50–55 vol. %. Some animals were treated while suspended, others were treated in the sitting position. In some of the tests, the oxygen concentration was kept constant at approximately 20 vol. %. It was observed that the turkeys treated in the sitting position were calmer than those treated while suspended and that those treated at an oxygen concentration equivalent to the normal level were calmer than those not treated in this way. Which turkeys become anaesthetized in a satisfying manner appears to be slightly random.

Test 8

On the basis of the observations made in the previous tests, the following tests were carried out with a normal oxygen concentration, i.e. approximately 20 vol. %, while the $CO_2$ concentration was varied. The impression was that the turkeys are much calmer if sufficient oxygen is present and they continue to breathe even in high $CO_2$ concentrations. In this test, twelve turkeys were treated with $CO_2$, the concentration of which increased from approximately 20 vol. % to approximately 55 vol. % over 2 minutes. The oxygen concentration was kept constant at approximately 20 vol. %. All the turkeys were in the sitting position. Of the twelve turkeys, one died on account of an excessive concentration of $CO_2$. Nine turkeys were anaesthetized well for over 1 minute. Two turkeys were only slightly anaesthetized.

Test 9

In order to confirm the results of test 8, the same treatment was carried out on fourteen more turkeys. Two turkeys died, one on account of an excessive concentration of $CO_2$ and one on account of a lack of oxygen. The rest were anaesthetized well for approximately one minute on average.

Test 10

Six turkeys were treated in the same way as in tests 8 and 9 and all were anaesthetized. They went directly to neck cutting and no reactions could be observed when the neck was cut. The bleeding was successful.

The tests described here showed that it is possible reversibly to anaesthetize turkeys using $CO_2$ in a gas comprising oxygen and $CO_2$, where the oxygen concentration is kept constant while the $CO_2$ concentration is varied.

Further tests were carried out to verify the effectiveness of the method, and to judge the degree of quality improvements of the meat. This tests have shown that anaesthetizing in accordance with the present invention produces satisfying results. The tests have been carried out on the basis of a total amount of 750 turkeys.

What is claimed is:

1. A method of treating poultry with gas before slaughter in order to anaesthetize or kill the poultry, the method comprising:
   exposing the poultry, during treatment thereof, to a gas containing oxygen and carbon dioxide;
   increasing the concentration of carbon dioxide either continuously or discontinuously during a plurality of phases;
   maintaining the concentration of the oxygen substantially constant throughout the phases of the treatment, wherein the concentration level of the oxygen is approximately equivalent to the concentration of oxygen in natural air which is between 18 and 22% volume.

2. The method as claimed in claim 1, further comprising:
   maintaining the concentration of carbon dioxide within a range of 0–25% volume in the first phase of the treatment; and
   maintaining the concentration of carbon dioxide within a range of 40–80% volume in the final phase of the treatment.

3. The method as claimed in claim 1, further comprising:
   maintaining the concentration of carbon dioxide within the range of 18–22% volume in a first phase of the treatment;
   maintaining the concentration of carbon dioxide within a range of 35–40% volume in a second phase of the treatment; and
   maintaining the concentration of carbon dioxide at approximately 50% volume in a third phase of the treatment.

4. The method as claimed in claim 3, further comprising:
   treating the poultry for a period of approximately 30 seconds in the first phase;
   treating the poultry for a period of approximately 50 seconds in the second phase; and treating the poultry for a period of approximately 30 seconds in the third phase.

5. The method as claimed in claim 2, wherein the concentration of carbon dioxide is increased continuously during the treatment.

6. An apparatus for treating poultry with gas before slaughter in order to anaesthetize or kill the poultry, said apparatus comprising:

a chamber provided with means for maintaining a substantially constant oxygen concentration of between 18 and 22% volume; and means for treating the poultry with a specified concentration of carbon dioxide gas within said chamber, wherein said means for treating the poultry with a specified concentration of carbon dioxide gas comprises a programmable control unit, at least one gas concentration sensor, a supply of carbon dioxide gas connected to said chamber, and at least one adjustable valve disposed between said supply of carbon dioxide gas and said chamber.

7. The apparatus as claimed in claim 6, wherein said chamber extends lengthwise and has an inlet and an outlet, said apparatus further comprising a conveyor for transporting the poultry through said chamber in a lengthwise direction thereof.

8. The apparatus as claimed in claim 7, wherein said chamber includes a base that slopes downwards from the inlet of said chamber in a direction toward the outlet of said chamber, said base sloping upwards at the outlet of said chamber.

9. The apparatus as claimed in claim 7, wherein said conveyor is a belt conveyor.

10. The apparatus as claimed in claim 7, wherein said chamber is divided into at least three separated zones into which both oxygen and carbon dioxide gas can be supplied, and the concentration of carbon dioxide increases from zone to zone in a direction towards the outlet of said chamber.

11. The apparatus as claimed in claim 10, wherein said zones are separated by louver curtains.

12. The apparatus as claimed in claim 10, wherein said chamber includes a base that slopes downwards from the inlet of said chamber in a direction toward the outlet of said chamber, said base sloping upwards at the outlet of said chamber.

13. An apparatus for treating poultry with gas before slaughter in order to anaesthetize or kill the poultry, said apparatus comprising:

a base member for supporting poultry to be treated;

a chamber provided with means for maintaining a substantially constant oxygen concentration of between 18 and 22% volume, said chamber including a bell-shaped closure that is capable of being lowered so as to envelope the poultry in cooperation with said base member;

a means for treating the poultry with a specified concentration of carbon dioxide gas within said chamber, said means comprising a gas delivery device connected to one of said closure and said base member, said gas delivery device being capable of supplying a gas comprising oxygen and carbon dioxide; and evacuating means, associated with one of said closure and said base member, for evacuating the gas from said chamber.

14. The apparatus as claimed in claim 13, further comprising a gas mixer connected to said gas delivery device, said gas mixer including means for measuring the concentration of oxygen and carbon dioxide.

15. The apparatus as claimed in claim 13, further comprising a gas mixer connected to said gas delivery device and having a plurality of mixing chambers, each of said mixing chambers containing gas having the same oxygen concentration and a different concentration of carbon dioxide relative to the other of said mixing chambers, wherein each of said mixing chambers can be selectively coupled to said chamber such that the chamber can be successively supplied with gas having a substantially constant oxygen concentration and a successively increasing concentration of carbon dioxide.

16. An apparatus for treating poultry with gas before slaughter in order to anaesthetize or kill the poultry, said apparatus comprising:

a chamber provided with means for maintaining a substantially constant oxygen concentration of between 18 and 22% volume, said chamber extending in a lengthwise direction and having an inlet and an outlet;

louver curtains provided in said chamber such that said chamber is divided into at least three separated zones;

a conveyor for transporting the poultry through said three zones of said chamber; and means for supply both oxygen and carbon dioxide into said separated zones such that the concentration of carbon dioxide increases from zone to zone in a direction toward the outlet.

17. The apparatus as claimed in claim 16, wherein said chamber includes a base that slopes downward from the chamber inlet in a direction towards the chamber outlet, and said base slopes upward at the chamber outlet.

18. An apparatus for treating poultry with gas before slaughter in order to anaesthetize or kill the poultry, said apparatus comprising:

a conveyor for transporting the poultry in a transport direction, said conveyor having an upper surface;

a plurality of chambers disposed at a level that is below the upper surface of the conveyor, each of said chambers having a bottom wall, side walls and an open top for receiving the poultry; and means for supplying oxygen and carbon dioxide gas to each of said chambers in a specified concentration such that the concentration of carbon dioxide in each of said chambers is successively higher in the transport direction, while the concentration of oxygen in said chambers is maintained at a substantially constant level of between 18 and 22% volume.

* * * * *